United States Patent
Chopra et al.

(10) Patent No.: US 11,248,131 B2
(45) Date of Patent: *Feb. 15, 2022

(54) REMOVABLE SUPPORT MATERIAL COMPRISING TACKIFIER FOR ADDITIVE MANUFACTURING

(71) Applicant: XEROX CORPORATION, Norwalk, CT (US)

(72) Inventors: Naveen Chopra, Oakville (CA); Baharak Bakhshaei, North York (CA); Carolyn Moorlag, Mississauga (CA); C. Geoffrey Allen, Waterdown (CA); Mandakini Kanungo, Penfield, NY (US); Santokh S. Badesha, Pittsford, NY (US); Seemit Praharaj, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 988 days.

This patent is subject to a terminal disclaimer.

(21) Appl. No.: 15/293,195

(22) Filed: Oct. 13, 2016

(65) Prior Publication Data

US 2018/0105705 A1    Apr. 19, 2018

(51) Int. Cl.
*C09D 5/26* (2006.01)
*B29C 64/00* (2017.01)
(Continued)

(52) U.S. Cl.
CPC ............... *C09D 5/26* (2013.01); *B29C 64/00* (2017.08); *B29C 64/112* (2017.08); *B33Y 10/00* (2014.12);
(Continued)

(58) Field of Classification Search
CPC ........ B29K 2295/0062; B29K 2075/00; B29K 2891/00; C08L 91/06; C09D 5/26;
(Continued)

(56) References Cited

U.S. PATENT DOCUMENTS

| | | |
|---|---|---|
| 5,556,727 A | 9/1996 | Ciccarelli et al. |
| 8,460,451 B2 | 6/2013 | Xu et al. |

(Continued)

FOREIGN PATENT DOCUMENTS

| | | |
|---|---|---|
| EP | 2 678 147 | 8/2012 |
| EP | 2678147 | * 1/2014 |

(Continued)

OTHER PUBLICATIONS

Hot Melt Inks for 3D Printing, Veronika Chovancova et al. in Digital Fabrication 2005 Baltimore, MD; Sep. 2005; p. 143-147; ISBN / ISSN: 0-89208-258-5 (excerpt from the Digital Fabrication 2005 Conference, held by IS&T (Society for Imaging Science and Technology).

(Continued)

*Primary Examiner* — Smita S Patel
(74) *Attorney, Agent, or Firm* — Pillsbury Winthrop Shaw Pittman LLP

(57) ABSTRACT

A support material for use in additive manufacturing includes greater than about 30 weight percent up to about 70 weight percent of a $C_{12}$ to $C_{18}$ fatty alcohol ethoxylate, about 30 weight percent to about 70 weight percent of a $C_{16}$ to $C_{22}$ fatty alcohol, and a tackifier, a transition temperature measured as the temperature immediately before phase change, based on viscosity measurement, is less than about 65° C. A system for additive manufacturing includes such a support material and a build material, the ratio of $C_{12}$ to $C_{18}$ fatty alcohol ethoxylate to $C_{16}$ to $C_{22}$ fatty alcohol is selected for property matching of the support material to the build material. A method of additive manufacturing includes providing such a system and printing via an inkjet printer the support material and the build material to provide a precursor to a three-dimensional printed article.

9 Claims, 7 Drawing Sheets

(51) Int. Cl.
  *B33Y 70/00* (2020.01)
  *B29C 64/112* (2017.01)
  *B33Y 10/00* (2015.01)
  *B33Y 30/00* (2015.01)
  *C09D 7/63* (2018.01)
  *C09D 11/102* (2014.01)
  *C09D 171/00* (2006.01)

(52) U.S. Cl.
  CPC .............. *B33Y 30/00* (2014.12); *B33Y 70/00* (2014.12); *C09D 7/63* (2018.01); *C09D 11/102* (2013.01); *C09D 171/00* (2013.01)

(58) Field of Classification Search
  CPC .............. C09D 171/00; C09D 11/102; B29C 2035/0838; B29C 2035/0827; B29C 64/00; B29C 64/112; B29C 67/0059; B41M 5/508; B33Y 10/00; B33Y 70/00; B33Y 30/00
  See application file for complete search history.

(56) References Cited

U.S. PATENT DOCUMENTS

| | | | |
|---|---|---|---|
| 8,575,258 B2 | 11/2013 | Stockwell et al. | |
| 9,138,981 B1 | 9/2015 | Hirsch et al. | |
| 2005/0074511 A1* | 4/2005 | Oriakhi | B33Y 70/00 425/174.4 |
| 2012/0213976 A1* | 8/2012 | Xu | C08L 91/06 428/195.1 |
| 2013/0236706 A1* | 9/2013 | Xu | C09D 7/63 428/195.1 |
| 2015/0344694 A1* | 12/2015 | Wu | B29C 64/00 264/308 |
| 2016/0032116 A1* | 2/2016 | Wu | C09D 11/12 427/256 |
| 2017/0066199 A1* | 3/2017 | Xu | C09D 7/63 |

FOREIGN PATENT DOCUMENTS

| | | |
|---|---|---|
| WO | 03/029365 A1 | 4/2003 |
| WO | 2012/116047 A1 | 8/2012 |
| WO | 2015/184220 A1 | 12/2015 |
| WO | WO20150184220 * | 12/2015 |

OTHER PUBLICATIONS

European Patent Office: "Extended European Search Report" re patent application of Xerox Corporation serial No. 17192380.8 dated Feb. 19, 2018, 7 pages.

* cited by examiner

US 11,248,131 B2

REMOVABLE SUPPORT MATERIAL COMPRISING TACKIFIER FOR ADDITIVE MANUFACTURING

BACKGROUND

The present disclosure relates to additive manufacturing. In particular, the present disclosure relates to sacrificial support materials used in connection with additive manufacturing.

Multi-jet modelling (MJM) or 3D inkjet printing processes typically require a sacrificial support material to be co-jetted with the build material. The support or encapsulation material allows one to maintain high aspect ratios and sharp walls in the finished article/product. The support material is typically of either the melt-away (phase-change) type or the wash-away (curable hydrophilic) type. Both materials' design sets have their limitations. Pure melting materials can oftentimes require high temperatures for removal, which can lead to warpage of the cured build materials. Also, removal of the last residual bits of support require manually picking/sanding parts, or rinsing with solvents. Pure washable/dissolvable materials usually require water-jet mechanical removal; this can become time-consuming and tedious when many parts need to be post-processed. Moreover, when delicate build parts are made, water-jet removal can break the build parts.

In addition to the issues raised above, there are two common failure modes of support materials that occur upon cooling. One failure is the formation of a 'trough' at build/support interface whereby the support material pulls away from a portion of the build material creating a V-shaped trough where the support material is flush against one portion of the build material but is pulled away from the build material distal to the flush portion. Another failure mode that occurs is warping (delamination) from the substrate upon which the support material has direct contact. Such warping creates a bowed structure with lifting (delamination) of the support material at opposing ends of the support material-substrate interface creating a gap between support material and substrate while direct contact between support material and substrate remains in a middle portion at the interface.

Embodiments herein provide a hybrid support material that is both washable and meltable for fast processing at modest temperatures, as well as additives to address trough formation and warping. Other advantages will be apparent to those skilled in the art.

SUMMARY

In some aspects, embodiments herein provide support materials for use in additive manufacturing comprising greater than about 30 weight percent up to about 70 weight percent of a $C_{12}$ to $C_{18}$ fatty alcohol ethoxylate, about 30 weight percent to about 70 weight percent of a $C_{16}$ to $C_{22}$ fatty alcohol, and a tackifier, wherein a transition temperature measured as the temperature immediately before phase change, based on viscosity measurement, is less than about 65° C.

In some aspects, embodiments herein provide systems for additive manufacturing comprising a support material for use in additive manufacturing comprising greater than about 30 weight percent up to about 70 weight percent of a $C_{12}$ to $C_{18}$ fatty alcohol ethoxylate, about 30 weight percent to about 70 weight percent of a $C_{16}$ to $C_{22}$ fatty alcohol, and a tackifier, wherein a transition temperature measured as the temperature just before phase change, based on viscosity measurement, is less than about 65° C., and a build material, wherein the ratio of $C_{12}$ to $C_{18}$ fatty alcohol ethoxylate to $C_{16}$ to $C_{22}$ fatty alcohol is selected for property matching the support material to a desired build material.

In some aspects, embodiments herein provide methods of additive manufacturing comprising providing a system a support material for use in additive manufacturing comprising greater than about 30 weight percent up to about 70 weight percent of a $C_{12}$ to $C_{18}$ fatty alcohol ethoxylate, about 30 weight percent to about 70 weight percent of a $C_{16}$ to $C_{22}$ fatty alcohol, and a tackifier, wherein a transition temperature measured as the temperature just before phase change, based on viscosity measurement, is less than about 65° C., and a build material, wherein the ratio of $C_{12}$ to $C_{18}$ fatty alcohol ethoxylate to $C_{16}$ to $C_{22}$ fatty alcohol is selected for property matching the support material to the build material, and printing via an inkjet printer the support material and the build material to provide a precursor to an three-dimensional printed article.

BRIEF DESCRIPTION OF DRAWINGS

Various embodiments of the present disclosure will be described herein below with reference to the figures wherein.

DETAILED DESCRIPTION

Figure 1:
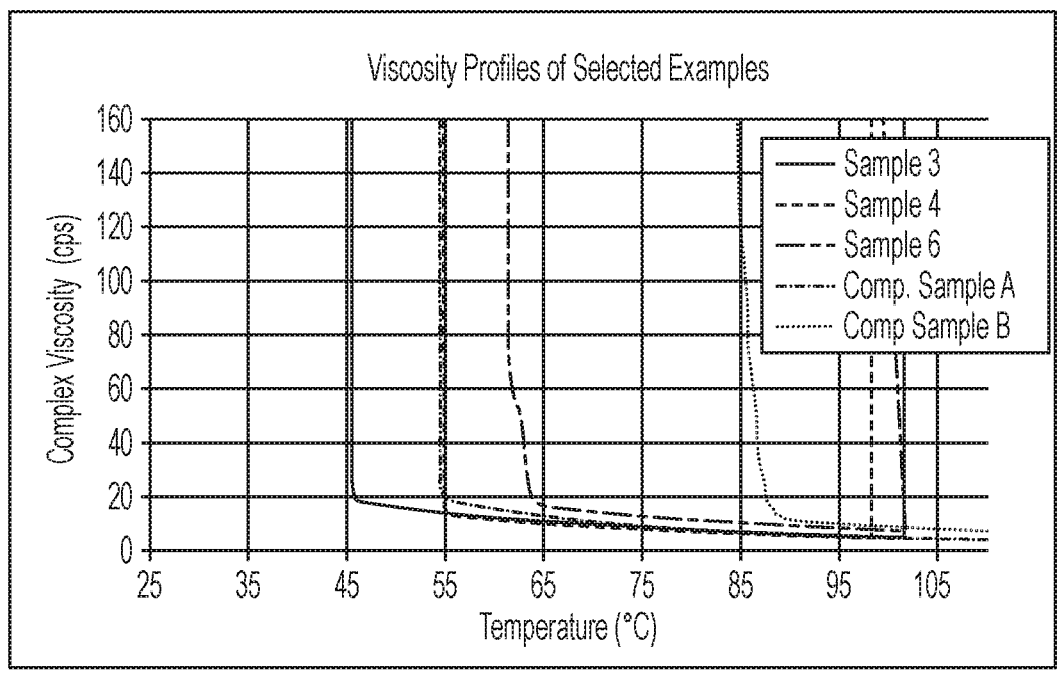
FIG. 1 shows a plot of viscosity versus temperature for support materials prepared with mixtures of fatty alcohols and fatty alcohol ethoxylates and comparative control materials.
Figure 2A:
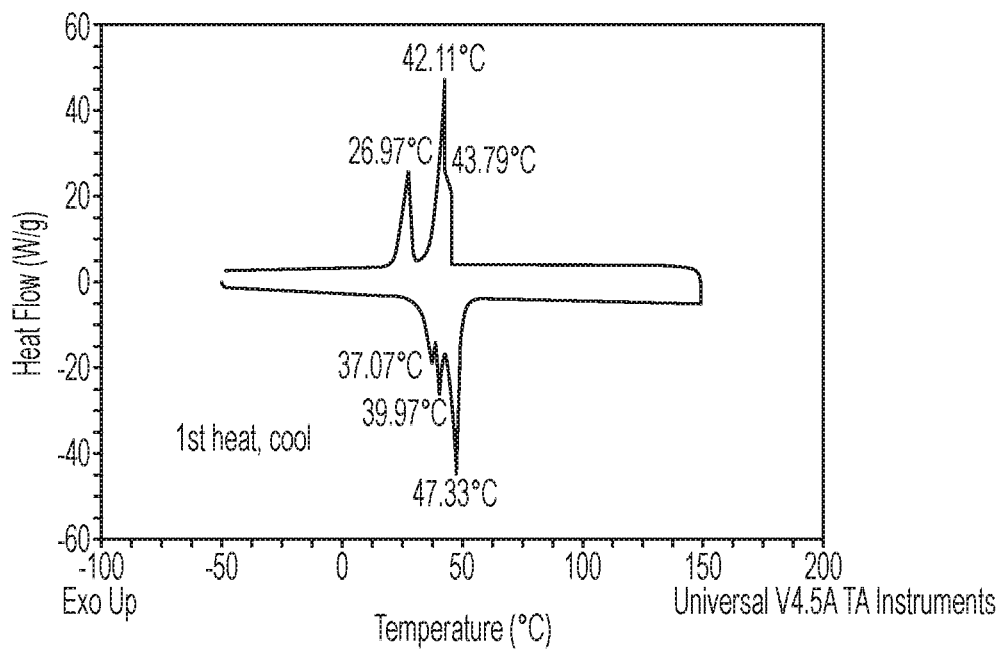
FIG. 2A shows a differential scanning calorimetry (DSC) curve for Sample 3 support material of Example 1.
Figure 2B:
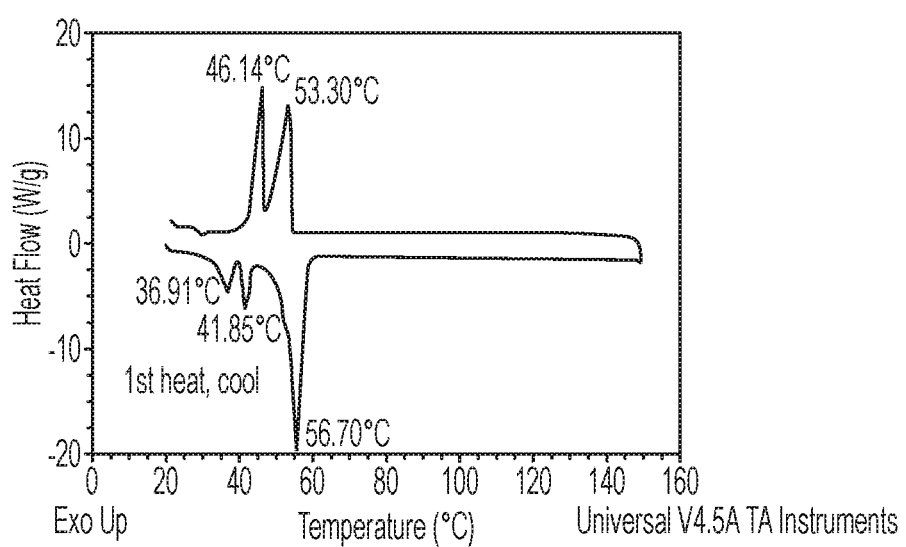
FIG. 2B shows a differential scanning calorimetry (DSC) curve for Sample 4 support material of Example 1.
Figure 2C:
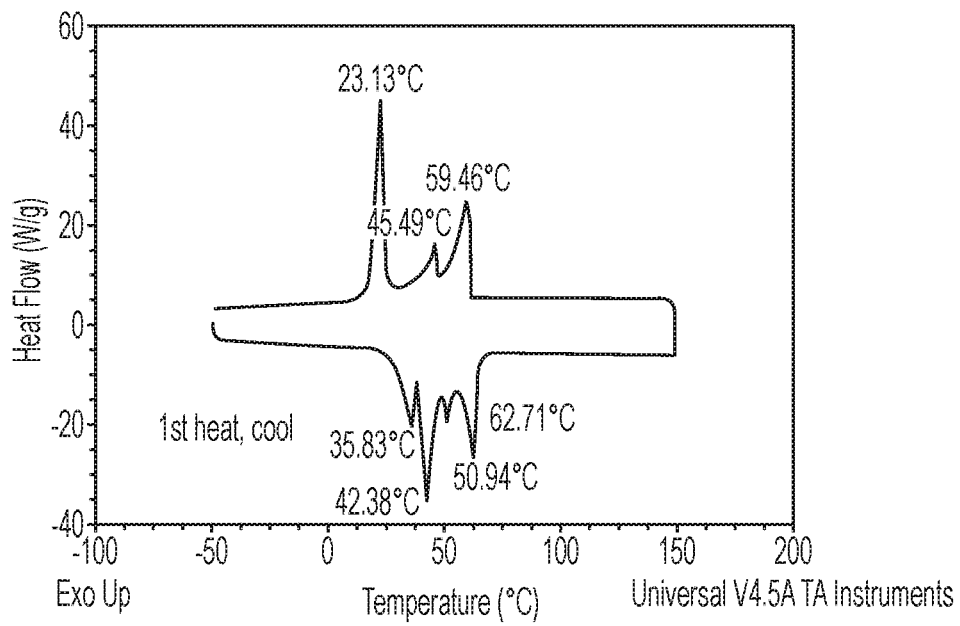
FIG. 2C shows a differential scanning calorimetry (DSC) curve for Sample 6 support material of Example 1.
Figure 2D:
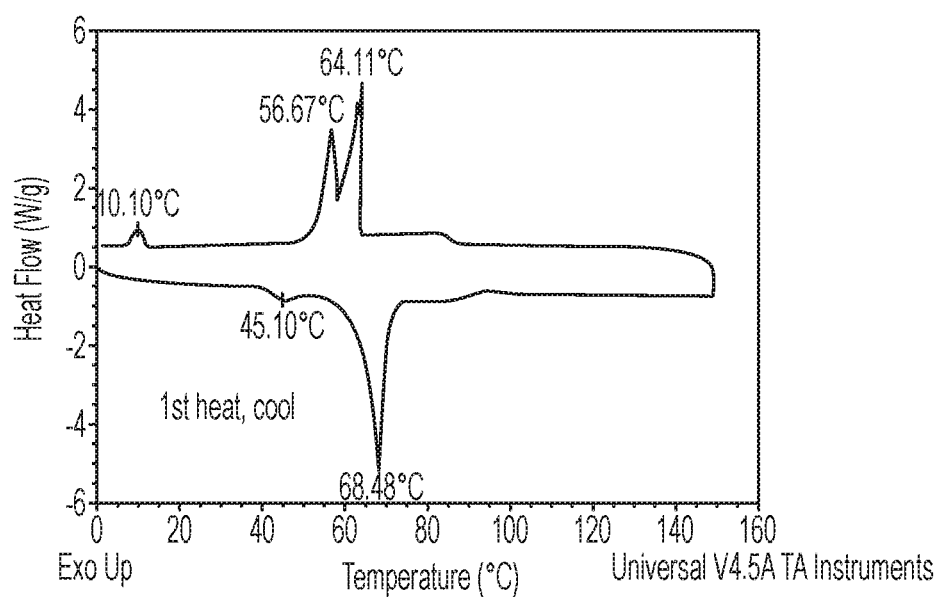
FIG. 2D shows a differential scanning calorimetry (DSC) curve for Comparative Sample A support material of Example 1.
Figure 2E:
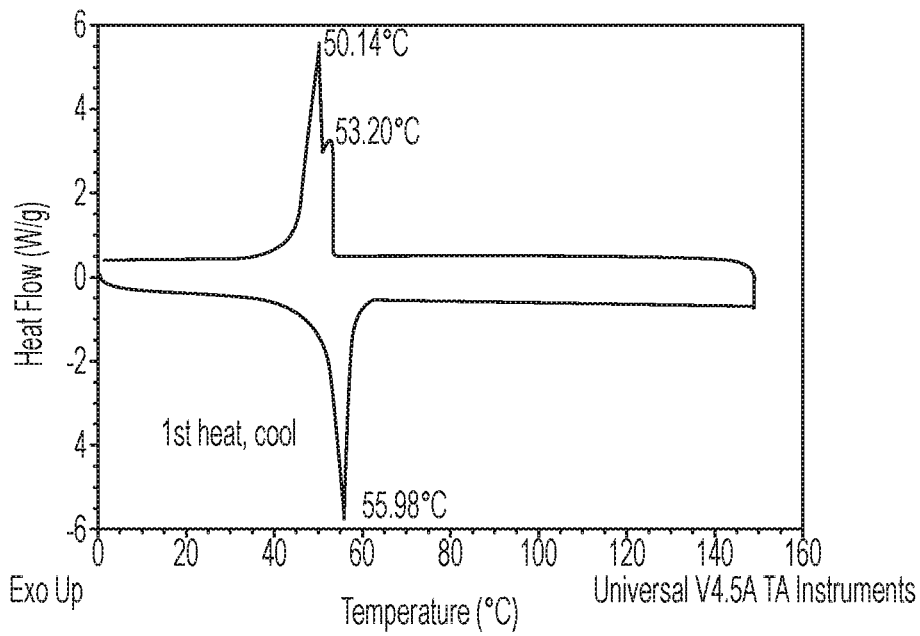
FIG. 2E shows a differential scanning calorimetry (DSC) curve for Comparative Sample B support material of Example 1.

Embodiments disclosed herein relate to support materials employed in additive manufacturing that are both water-washable and meltable materials. Support materials are sacrificial materials that are co-printed with build materials in MJM (multi-jet modeling). Embodiments herein employ ethoxylated fatty alcohols as part of the support material compositions. The role of the ethoxylate is believed to be to impart water miscibility and the fatty alcohol's role is believed to be to impart the phase-change behavior. There are several challenges when using such materials in formulating jettable (i.e., via inkjet print techniques) materials for washable/meltable supports, including the following: (1) prohibitively high viscosities for water dispersible components: Many materials based on polar ethoxylates require elevated temperatures in excess of 100° C. to attain jettable viscosities (less than or equal to about 10 cps), which temperatures may be outside of the post-processing temperature range. For example, at such high temperatures, cured build materials can soften and warp. (2) Phase separation and decomposition. Some commercial ethoxylated materials show phase-separation and/or clouding and/or degradation at elevated temperatures due to residual impurities from their preparation. (3) Managing dimensional change, adhesion and wettability. The waxy component of the inkjettable support material may exhibit large volume changes on solidification, leading to warping during cooling. This can lead to errors in part fidelity and accuracy. Also, adhesion and wettability of waxy components is typically poor, owing to the surface tension mismatch between build and support materials. (4) Low support removal rates. Current 'wash only' supports typically require mechanical break-up with water jets or diffusion to swell and remove the support from the build structure. A large amount of time and energy is therefore required. Removal of 'melt-only' supports also require lengthy oven times for complete support material removal.

Embodiments herein provide support materials that are hybrid materials combining the fast processing time of a pure meltaway support with the completeness of a water-washing step. In embodiments, such a hybrid support material may employ, for example, water soluble ethoxylated fatty alcohols combined with fatty alcohols in ratios designed to provide target desired melting temperatures and washability rates in order to facilitate near complete to complete support removal (post-processing) on a short timescale. Advantages of the embodiments herein include, without limitation, providing a washable phase change composition that may improve support removal efficiency and may reduce post-processing time.

In some embodiments, the compositions disclosed herein may reduce the formation of troughs and warping of the support material. In some such embodiments, there are provided water-washable and meltable support material compositions comprising a tackifier resin. The presence of a tackifier may enhance adhesion, wettability, and improve interfaces with build materials and substrates (platform upon which the build occurs) without sacrificing wash removal rates. Surprisingly, the tackifiers disclosed herein, while inherently water insoluble components, are miscible in the water washable and meltable compositions disclosed herein. Thus, embodiments herein provide a water-washable and meltable support material composition comprising a tackifier resin. Support materials comprising tackifier resins may exhibit enhanced adhesion, wettability, and improved interface of support material with build materials or substrate (platform) without sacrificing jettability or wash removal rates.

In embodiments, the support material may further comprise a colorant. In embodiments, the support ink may comprise at least two or more colorants. In embodiments, the build ink may comprise one or more colorants different from the support ink colorant. In embodiments, a colorant may be absent from the build ink. In embodiments, the at least one colorant may be miscible in the support ink. In embodiments, the at least one colorant is miscible in the support ink, but not in the build ink. In embodiments, the at least one colorant is a dye or pigment.

In embodiments, there are provided support materials for use in additive manufacturing comprising greater than about 30 weight percent up to about 70 weight percent of a $C_{12}$ to $C_{18}$ fatty alcohol ethoxylate and about 30 weight percent to about 70 weight percent of a $C_{16}$ to $C_{22}$ fatty alcohol, wherein a transition temperature measured as the temperature immediately before phase change, based on viscosity measurement, is less than about 65° C. As demonstrated in the Examples below, the ratios within the bounds described herein can be varied to achieve appropriate melting properties of the support material relative to the desired build material. For example, the ratios can be adjusted to alter the melting point of the support material for compatibility with the desired build material such that the build material structural integrity is not compromised at the melting temperature of the support material.

In order assess a transition temperature measured as the temperature immediately before phase change, based on viscosity measurement, is less than about 65°, the measurement is made by doing a temperature step viscosity measurement starting from high temperature to low temperature, and noting the last temperature before the viscosity that undergoes a sharp transition from low to high, typically by 2 to 3 orders of magnitude (i.e., from about 10 cps to about 100 or about 1000 cps or more).

In embodiments, the support material may be removable from a build material by washing, melting, or combinations thereof. In embodiments, the support material may have a dissolution rate at concentrated conditions (100 mg/mL) at 75° C. in a range from about 160 to about 500 mg/min. In embodiments, the support material may have a dissolution rate at concentrated conditions (3 mg/mL) at 25° C. in a range from about 10 to about 75 mg/min.

In embodiments, the ratio of $C_{12}$ to $C_{18}$ fatty alcohol ethoxylate to $C_{16}$ to $C_{22}$ fatty alcohol may be selected for property matching the support material to a desired build material. In embodiments, such property matching comprises surface tension. In embodiments such property matching comprises wettability. In some such embodiments, a tackifier may be used as described herein below.

In embodiments, there are provided systems for additive manufacturing comprising a support material for use in additive manufacturing comprising greater than about 30 weight percent up to about 70 weight percent of a $C_{12}$ to $C_{18}$ fatty alcohol ethoxylate and about 30 weight percent to about 70 weight percent of a $C_{16}$ to $C_{22}$ fatty alcohol, wherein a transition temperature measured as the temperature just before phase change, based on viscosity measurement, is less than about 65° C., and a build material, wherein the ratio of $C_{12}$ to $C_{18}$ fatty alcohol ethoxylate to $C_{16}$ to $C_{22}$ fatty alcohol is selected for property matching the support material to a desired build material. In embodiments, support material is removable from a build material by washing, melting, or combinations thereof.

In embodiments, the support material may comprise a colorant. In embodiments, the build material may comprise a colorant. In some systems, the build and support materials are differentially colored.

In embodiments, the support material has a dissolution rate at concentrated conditions (100 mg/mL) at 75° C. in a range from about 160 to about 500 mg/min.

In embodiments, the support material has a dissolution rate at concentrated conditions (3 mg/mL) at 25° C. in a range from about 10 to about 75 mg/min.

In embodiments, the build material may comprise acrylate functional monomers. Further examples of suitable build materials are described herein further below.

In embodiments, there are provided methods of additive manufacturing comprising providing a system a support material for use in additive manufacturing comprising greater than about 30 weight percent up to about 70 weight percent of a $C_{12}$ to $C_{18}$ fatty alcohol ethoxylate, and about 30 weight percent to about 70 weight percent of a $C_{16}$ to $C_{22}$ fatty alcohol, wherein a transition temperature measured as the temperature just before phase change, based on viscosity measurement, is less than about 65° C., and a build material, wherein the ratio of $C_{12}$ to $C_{18}$ fatty alcohol ethoxylate to $C_{16}$ to $C_{22}$ fatty alcohol is selected for property matching to a desired build material, and printing via an inkjet printer the support material and the build material to provide a precursor to an three-dimensional printed article.

Methods may further comprise removing the support material from the build material by washing the support material with a solvent. In embodiments, the removing of the support material from the build material may be by melting the support material. In embodiments, the removing of the support material from the build material by both washing and melting the support material.

In embodiments, the support material, build material, or both comprise a colorant. Differential use of colors in the methods herein may provide a visual aide to know when removal of the support material is complete.

In embodiments, the support material has a dissolution rate at concentrated conditions (100 mg/mL) at 75° C. in a range from about 160 to about 500 mg/min. In embodiments, the support material has a dissolution rate at concentrated conditions (3 mg/mL) at 25° C. in a range from about 10 to about 75 mg/min.

In embodiments, there are provided support materials for use in additive manufacturing comprising greater than about 30 weight percent up to about 70 weight percent of a $C_{12}$ to $C_{18}$ fatty alcohol ethoxylate, about 30 weight percent to about 70 weight percent of a $C_{16}$ to $C_{22}$ fatty alcohol, and a tackifier, wherein a transition temperature measured as the temperature just before phase change, based on viscosity measurement, is less than about 65° C.

In embodiments, the support material may be removable from a build material by washing, melting, or combinations thereof.

In embodiments, support materials comprising a tackifier may further comprise a colorant.

In embodiments, the support material has a dissolution rate at concentrated conditions (100 mg/mL) at 75° C. in a range from about 160 to about 500 mg/min. In embodiments, the support material has a dissolution rate at concentrated conditions (3 mg/mL) at 25° C. in a range from about 10 to about 75 mg/min.

In embodiments, the ratio of $C_{12}$ to $C_{18}$ fatty alcohol ethoxylate to $C_{16}$ to $C_{22}$ fatty alcohol is selected for property matching to a desired build material.

In embodiments, there are provided systems for additive manufacturing comprising a support material for use in additive manufacturing comprising greater than about 30 weight percent up to about 70 weight percent of a $C_{12}$ to $C_{18}$ fatty alcohol ethoxylate about 30 weight percent to about 70 weight percent of a $C_{16}$ to $C_{22}$ fatty alcohol, and a tackifier, wherein a transition temperature measured as the temperature just before phase change, based on viscosity measurement, is less than about 65° C., a build material, wherein the ratio of $C_{12}$ to $C_{18}$ fatty alcohol ethoxylate to $C_{16}$ to $C_{22}$ fatty alcohol is selected for property matching the support material to the build material.

In embodiments, the support material may be removable from a build material by washing, melting, or combinations thereof.

In embodiments, the support material comprises a colorant. In embodiments, the build material comprises a colorant.

In embodiments, the support material has a dissolution rate at concentrated conditions (100 mg/mL) at 75° C. in a range from about 160 to about 500 mg/min. In embodiments, the support material has a dissolution rate at concentrated conditions (3 mg/mL) at 25° C. in a range from about 10 to about 75 mg/min.

In embodiments, the build material comprises acrylate functional monomers.

In embodiments, there are provided methods of additive manufacturing comprising providing a system a support material for use in additive manufacturing comprising greater than about 30 weight percent up to about 70 weight percent of a $C_{12}$ to $C_{18}$ fatty alcohol ethoxylate, about 30 weight percent to about 70 weight percent of a $C_{16}$ to $C_{22}$ fatty alcohol, and a tackifier, wherein a transition temperature measured as the temperature just before phase change, based on viscosity measurement, is less than about 65° C. and a build material, wherein the ratio of $C_{12}$ to $C_{18}$ fatty alcohol ethoxylate to $C_{16}$ to $C_{22}$ fatty alcohol is selected for property matching to a desired build material; and printing via an inkjet printer the support material and the build material to provide a precursor to an three-dimensional printed article.

In embodiments, method may further comprise removing the support material from the build material by washing the support material with a solvent. In embodiments, methods may further comprise removing the support material from the build material by melting the support material. In embodiments, methods may further comprise removing the support material from the build material by both washing and melting the support material.

In embodiments, the support material, build material, or both may comprise a colorant.

In embodiments, the support material has a dissolution rate at concentrated conditions (100 mg/mL) at 75° C. in a range from about 160 to about 500 mg/min. In embodiments, the support material has a dissolution rate at concentrated conditions (3 mg/mL) at 25° C. in a range from about 10 to about 75 mg/min.

Colorants

Various suitable colorants of any color can be present in the toners, including suitable colored pigments, dyes, and mixtures thereof including REGAL 330®; (Cabot), Acetylene Black, Lamp Black, Aniline Black; magnetites, such as Mobay magnetites M08029®, M08060®; Columbian magnetites; MAP ICO® BLACKS and surface treated magnetites; Pfizer magnetites CB4799®, CB5300®, CB5600®, MCX6369®; Bayer magnetites, BAYFERROX 8600®, 8610®; Northern Pigments magnetites, NP-604®, NP 608®; Magnox magnetites TMB-100®, or TMB-104®; and the like; cyan, magenta, yellow, red, green, brown, blue or mixtures thereof, such as specific phthalocyanine HELIOGEN BLUE L6900®, D6840®, D7080®, D7020®, PYLAM OIL BLUE®, PYLAM OIL YELLOW®, PIGMENT BLUE 1® available from Paul Uhlich & Company, Inc., PIGMENT VIOLET 1®, PIGMENT RED 48®, LEMON CHROME YELLOW DCC 1026®, E.D. TOLU- IDINE RED® and BON RED C® available from Dominion Color Corporation, Ltd., Toronto, Ontario, NOVAPERM YELLOW FGL®, HOSTAPERM PINK E® from Hoechst, and CINQUASIA MAGENTA® available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include copper tetra(octadecyl sulfonamido) phthalocyanine, x copper phthalocyanine pigment listed in the Color Index as CI 74160, CI Pigment Blue, and Anthrathrene Blue, identified in the Color Index as CI 69810, Special Blue X 2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5 dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant, more specifically black, cyan, magenta and/or yellow colorant, may be incorporated in an amount sufficient to impart the desired color to the build or support inks. In general, pigment or dye is selected, for example, in an amount of from about 2 to about 60% by weight, or from about 2 to about 9% by weight for color build or support inks, and about 3 to about 60% by weight for black build or support inks.

In embodiments, the build ink is UV curable. In embodiments, the support ink is UV curable.

Build Materials

Numerous build materials are suitable for use with support materials disclosed herein. Build materials may be based on the one or more of the following aliphatic and aromatic monomers: 1. monofunctional monomers, including, but not limited to 2-phenoxyethylacrylate, alkoxylated lauryl acrylate, alkoxylated phenol acrylate, alkoxylated tetrahydrofurfuryl acrylate, caprolactone acrylate, cyclic trimethylolpropane formyl acrylate, ethylene glycol methyl ether methacrylate, ethoxylated nonyl phenol acrylate, isobornyl acrylate (SR506, available from Sartomer Chemical Corp.), isodecyl acrylate, isooctyl acrylate, lauryl acrylate, octadecyl acrylate (stearyl acrylate), tetrahydrofurfuryl acrylate (SR285, from Sartomer Chemical Co.), tridecyl acrylate, 4-acryolyl morpholine (from Aldrich Chemical Co.); 2. difunctional monomers, including, but not limited to 1,12 dodecane diol diacrylate, 1,3-butylene glycol diacrylate, 1,4-butanediol diacrylate, 1,6-hexanediol diacrylate (SR238B, from Sartomer Chemical Co.), alkoxylated hexanediol diacrylate, alkoxylated neopentyl glycol diacrylate, cyclohexane dimethanol diacrylate, diethylene glycol diacrylate (SR230, from Sartomer Chemical Co.), ethoxylated (4) bisphenol A diacrylate (SR601, from Sartomer Chemical Co.), neopentyl glycol diacrylate, polyethylene glycol (400) diacrylate (SR344, from Sartomer Chemical Co.), propoxylated (2) neopentyl glycol diacrylate (SR9003B, from Sartomer Chemical Co.), tetraethylene glycol diacrylate, tricyclodecane dimethanol diacrylate (SR833S, from Sartomer Chemical Co.), triethylene glycol diacrylate (SR272, from Sartomer Chemical Co.), tripropylene glycol diacrylate; 3. trifunctional monomers, including, but not limited to ethoxylated (9) trimethylol propane triacrylate, pentaerythritol triacrylate, propoxylated (3) glyceryl triacrylate (SR9020, from Sartomer Chemical Co.), propoxylated (3) trimethylol propane triacrylate (SR492, from Sartomer Chemical Co.), tris (2-hydroxyethyl) isocyanurate triacrylate (SR368, from Sartomer Chemical Co.); 4. multifunctional monomers, including, but not limited to di-trimethylolpropane tetraacrylate, dipentaerythritol pentaacrylate (SR399, from Sartomer Chemical Co.), ethoxylated (4) pentaerythritol tetraacrylate (SR494, from Sartomer Chemical Co.); 5. oligomers, including, but not limited to polyester acrylates, polyether acrylates, epoxy acrylates, and urethane acrylates.

Examples of polyester acrylate oligomers include, without limitation CN293, CN299, CN292, CN296, CN2279, CN2262, CN2267, CN2200, CN2203, CN2281, and CN2281 from Sartomer Chemical Co.

Examples of polyether acrylate oligomers include, without limitation Genomer 3364, Genomer 3414, Genomer 3457, Genomer 3497, all available from Rahn Corp.

Examples of epoxy acrylate oligomers include, without limitation CN104Z, CN2102E, CN110, CN120Z, CN116, CN117, CN118, CN119, and CN2003B, all available from Sartomer Chemical Co. Further examples include, without limitation Genomer 2235, Genomer 2252, Genomer 2253, Genomer 2255, Genomer 2259, Genomer 2263, Genomer 2280, and Genomer 2281, all available from Rahn Corp.

Examples of urethane acrylate oligomers include, without limitation aromatic urethane oligomers such as: CN9782, CN9783, CN992, CN975 (hexafunctional), CN972, all available from Sartomer Chemical Co. Also Genomer 4622 and Genomer 4217 (Rahn Corp.). Aliphatic urethanes include, without limitation CN9004, CN9005, CN9006, CN9006, CN9023, CN9028, CN9178, CN969, CN9788, CN986, CN989, CN9893, CN996, CN2920, CN3211, CN9001, CN9009, CN9010, CN9011, CN9071, CN9070, CN929, CN962, CN9025, CN9026, CN968, CN965, CN964, CN991, CN980, CN981, CN983, CN9029, CN9030, CN9031, CN9032, CN9039, CN9018, CN9024, CN9013 (all from Sartomer Chemical Co.). Other examples include, without limitation Genoer 4188, Cnomer 4215, Genomer 4230, Genomer 4267, Genomer 4269, Genomer 4312, Genomer 4316, Genomer 4425, Genomer 4590, and Genomer 4690 (all from Rahn Corp.).

Other examples of urethane acrylate oligomers include, without limitation the BOMAR™ series of urethane oligomers available from Dymax Corporation, including, without limitation BR-441B, BR-471, BR704P, BR-741, BR-742P, BR-7432GI30, BR-744BT, BR742M, B-952, BR-116, BR-146, and BR-202.

Further examples include, without limitation trifunctional urethane acrylate oligomers from IGM Resins such as Photomer 6008, Photomer 6010, Photomer 6019, Photomer 6019, Photomer 6184, Photomer 6630, and Photomer 6892.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes various support material formulations comprising fatty alcohol and fatty alcohol ethoxylates, in accordance with embodiments herein.

Washable phase-change support ink compositions were formulated by blending together ethoxylated fatty alcohols with fatty alcohols. The generic structures of various fatty alcohol and their ethoxylates are shown below and exemplary commercially available products are shown in Table 1.

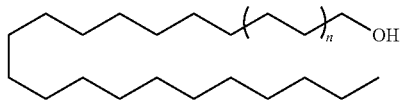
fatty alcohol

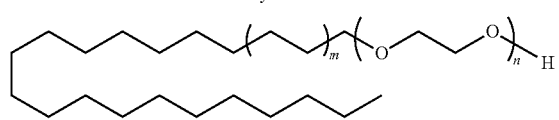
fatty alcohol ethoxylate

TABLE 1

| Component | Structure(s) | Supplier/Notes |
| --- | --- | --- |
| Unithox 490 | $CH_3-(CH_2-CH_2)_m-(OCH_2CH_2)_n-OH$ | Baker Hughes Corp./ Mw distribution average of 4,600; 86-94% EO content |
| Emulgin B2 | 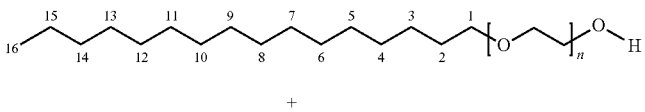 n = 20 | Supplier: BASF Cetearyl alcohol ethoxylate (cetearyl is a blend of cetyl (C16) and stearyl (C18)); CAS# 68439-49-6; (also called Ceteareth-20, Cremophor A20, Hexotol CS20) |
| Brij L23 | 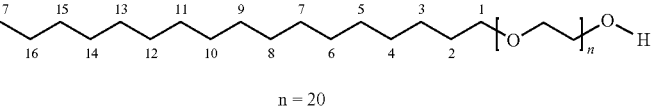 n = 23 | Supplier: BASF Polyoxylethylene (23) lauryl ether CAS# 9002-92-0 laureth-23 |
| Brij 58 | 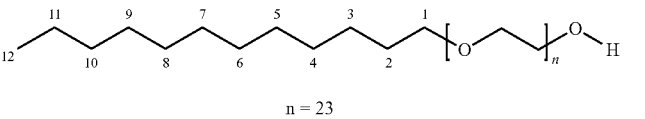 n = 20 | Supplier: BASF Polyoxyethylene (20) cetyl ether CAS# 9004-95-9 ceteth-20 |
| Unithox 470 | $CH_3-(CH_2-CH_2)_m-(OCH_2CH_2)_n-OH$ | Supplier: Baker Hughes BEX-1155 Mw approx. 1840, 70% ethylene oxide (EO) content |
| Emulgade 1000D | 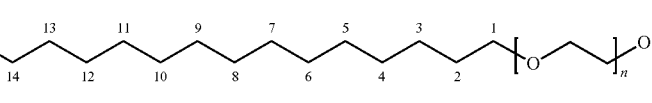 n = 20 as a mixture with: 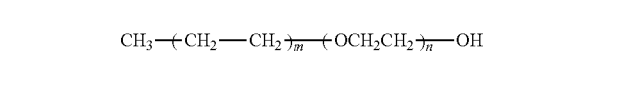 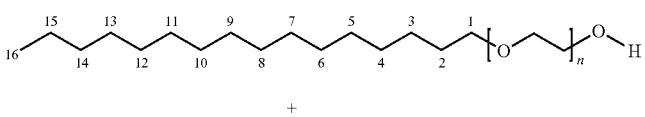 | Supplier: BASF A mixture of cetearyl alcohol and ceteareth-20 (up to 4 different compounds) Emulgin B2 + cetearyl alcohol Ratio of the components unknown |

TABLE 1-continued

| Component | Structure(s) | Supplier/Notes |
|---|---|---|
| Cetyl alcohol | CH$_3$(CH$_2$)$_{14}$CH$_2$OH (16-carbon chain with terminal OH) | Supplier: Croda |
| Stearyl alcohol | CH$_3$(CH$_2$)$_{16}$CH$_2$OH (18-carbon chain with terminal OH) | Supplier: Croda |

With regard to Samples 9 and 10 in Table 2 using Emulgade 1000D, note that the ratios are flipped (68:32 Emulgade1000D:fatty alcohol). However, as indicated in the Table 1, Emulgade already consists of a blend of fatty alcohol ethoxylate and fatty alcohol, so the true ratio of ethoxylate:alcohol is closer to the other examples. It was found that Emulgade alone was not suitable as a support, so further experiments indicated the need to add more fatty alcohol to restore the hardness and phase-change character to make it suitable for support material for 3D printing applications.

Most of these materials in Table 1 have been used in personal care products (gels, waxes, lotions, creams, etc.). Thus, the support materials provided herein have added fatty alcohol to generate the requisite phase-change, to reduce viscosity, and to improve hardness to render them into jettable support materials.

Many materials combinations were prepared and tested, but only a few combinations could achieve target melting temperatures and washability, while still being jettable in MJM printing. Table 2 below summarizes the various formulations.

TABLE 2

| | | Sample # | | | | | | | | | |
|---|---|---|---|---|---|---|---|---|---|---|---|
| | | 1 | | 2 | | 3 | | 4 | | 5 | |
| | | % | m/g | % | m/g | % | m/g | % | m/g | % | m/g |
| Fatty Alcohol Ethoxylate | Unithox 490 | 40 | 6.0 | 30 | 4.5 | | | | | | |
| | Emulgin B2 | | | | | 40 | 6.0 | 30 | 3.0 | 50 | 5.0 |
| | Brij ® L23 | | | | | | | | | | |
| | Brij 58 | | | | | | | | | | |
| | Unithox 470 | | | | | | | | | | |
| | Emulgade 1000D | | | | | | | | | | |
| Fatty Alcohol | Cetyl alcohol | 60 | 9.0 | | | 60 | 9.0 | | | | |
| | Stearyl alcohol | | | 70 | 10.5 | | | 70 | 7.0 | | |
| | Behenyl alcohol | | | | | | | | | 50 | 5.0 |
| | Total | 100 | 15.0 | 100 | 15.0 | 100 | 15.0 | 100 | 15.0 | 100 | 10.0 |
| | | 6 | | 7 | | 8 | | 9 | | 10 | |
| Fatty Alcohol Ethoxylate | Unithox 490 | | | | | | | | | | |
| | Emulgin B2 | | | | | | | | | | |
| | Brij ® L23 | 55 | 8.25 | | | | | | | | |
| | Brij 58 | | | 55 | 8.25 | | | | | | |
| | Unithox 470 | | | | | 50 | 10 | | | | |
| | Emulgade 1000D | | | | | | | 68 | 13.5 | 68 | 13.5 |
| Fatty Alcohol | Cetyl alcohol | | | | | | | | | | |
| | Stearyl alcohol | | | | | 50 | 10 | 32 | 6.5 | | |
| | Behenyl alcohol | 45 | 6.75 | 45 | 6.75 | | | | | 32 | 6.5 |
| | Total | 100 | 15.0 | 100 | 15.0 | 100 | 20.0 | 100 | 20.0 | 100 | 20.0 |

Comparative Samples A and B were also provided as follows:

Comp. Sample A: A commercially available meltable support material for additive manufacturing.

Comp. Sample B: An experimental material comprised of Unithox (approx. 52% Unithox 550, 47% behenyl alcohol, 0.45% Naugard 445).

General Procedure for Preparation of Table 2 Formulations

Generally the designated amount of each material was weighed out into 50 mL beakers and the mixtures were heated to 90° C. with magnetic stirring in a Vario-Mag thermowell stirrer until the contents were completely molten (normally about 20 minutes). After mixing, the molten material was poured into a rubber mold to solidify. Characterization of Support Material Compositions and Comparative Examples Rheology: Samples were tested by measuring their complex viscosities over temperature using an Ares G2 rheometer equipped with a 25 mm Parallel plate and Peltier heating system. Samples of the inks were loaded on the rheometer at 102° C., allowed to equilibrate, then swept over temperature to 25° C. at a rate of 1.5° C./min at 10 rad/s. An overlay of viscosity curves for selected formulations versus comparative Samples is shown in FIG. 1.

Differential Scanning calorimetry (DSC) Characterization: The DSC curves were measured at a heating rate of 20° C./min, heat-cool-heat cycle. FIGS. 2A through 2E are the DSC traces of selected Samples 3, 4, 6, and Comparative Samples A and B, respectively. The Comparative Sample B shows a high melting and broad curve, indicating poor suitability for a meltable/washable hybrid material.

Functional test for dissolvability/meltability: Pucks of material were prepared as per the general procedure above and the initial mass was recorded. The puck was then placed in a 50 mL beaker containing an appropriate amount of water to result in a 0.1 g/mL solid in solvent dispersion. The beakers were then warmed to 75° C. with stirring at 225 RPM using a Vario-Mag thermowell. The pucks were allowed to melt/dissolve in the warm water bath and the residual puck was removed from the bath, dried, and weighed again. The mass lost was expressed in mg/min. A secondary test was also done on samples where the water bath was kept at 25° C. with stirring under more dilute conditions (3 mg/mL) at 320 RPM. Table 3 summarizes the dissolution data for selected Samples and the 2 comparative Samples.

TABLE 3

| | Sample # | | | | |
|---|---|---|---|---|---|
| | 3 | 4 | 6 | Comp. Sample A | Comp. Sample B |
| Viscosity at 90° C. (cps) | 6.3 | 5.6 | 9.3 | 5.9 | 11.6 |
| Transition Temperature (° C.)$^a$ | 45 | 55 | 61 | 54 | 89 |
| Dissolution rate (mg/min)$^b$ | 490 | 240 | 163.3 | 0 | 0 |
| Dissolution rate (mg/min)$^c$ | 9.3 | 2.5 | 74.8 | 0 | 125.3 |

$^a$Temperature just before phase change, based on viscosity measurement
$^b$Dissolution rate at concentrated conditions (100 mg/mL) at 75° C.
$^c$Dissolution rate at high dilution conditions (3 mg/mL) at 25° C.

Example 2

These Examples describes various support material formulations comprising fatty alcohol and fatty alcohol ethoxylates, along with tackifiers, in accordance with embodiments herein.

Tackifier materials are typically rosin gum ester materials that find numerous applications in hot-melt adhesives, PSA's (pressure sensitive adhesives), and inks. They are typically amorphous in nature and can be esterified to create compounds with varying $T_g$'s or softening points. Below are shown some typical tackifier resin structures. Support ink formulations were prepared with various tackifiers, and compared to a control composition with no tackifier present. The compositions are summarized in Table 4.

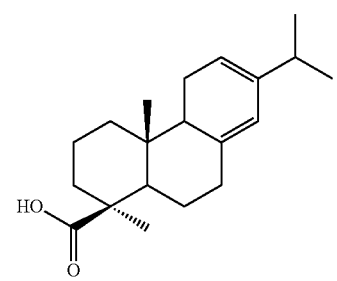

rosin acid

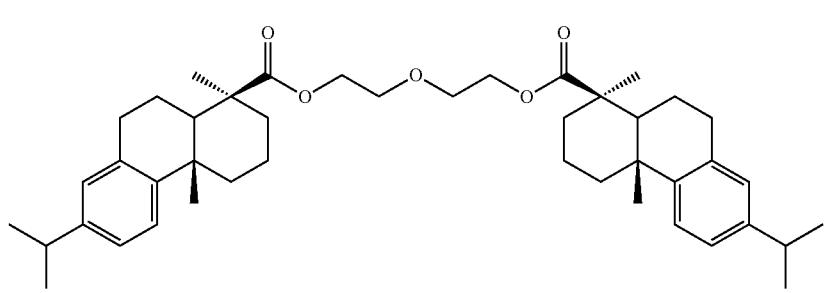

diethylene glycol ester of rosin acid

-continued
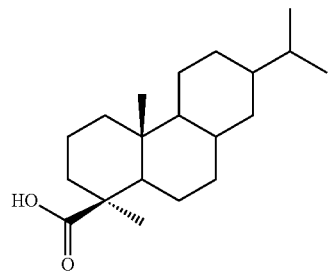
hydrogenated rosin acid
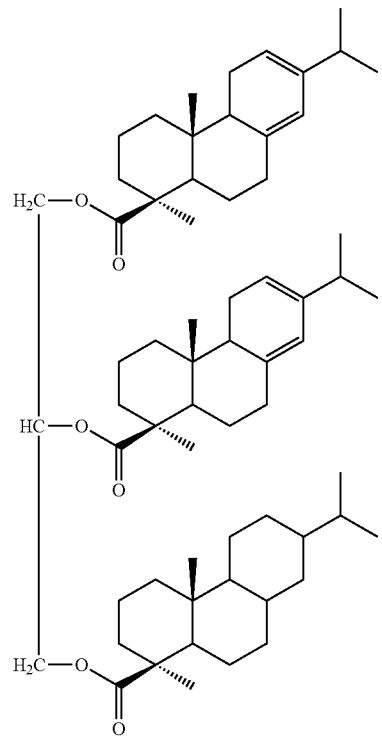
glycerol ester of rosin acid
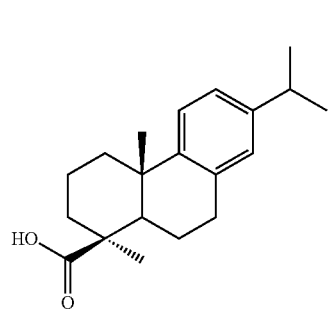
aromatic rosin acid
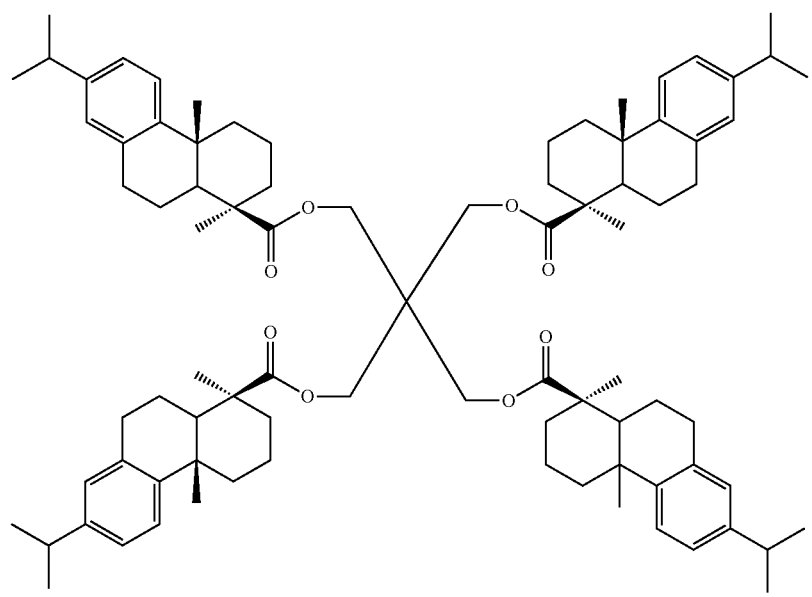
pentaerithritol ester of rosin acid

TABLE 4

| | | 1 % | 1 m/g | 2 % | 2 m/g | 3 % | 3 m/g | 4 (prophetic) % | 4 (prophetic) m/g | 5 (control) % | 5 (control) m/g |
|---|---|---|---|---|---|---|---|---|---|---|---|
| Fatty Alcohol Ethoxylate | Brij ® L23 | 40.0 | 6.0 | | | | | 40.0 | 6.0 | | |
| | Emulgin B2 | | | 30.0 | 6.0 | 30.0 | 6.0 | | | 30.0 | 3.0 |
| Fatty Alcohol | Cetyl alcohol | | | | | | | 55.0 | 8.25 | | |
| | Stearyl alcohol | 55% | 8.25 | 65.0 | 13.0 | 65.0 | 13.0 | | | 70.0 | 7.0 |
| Tackifier | Sylvalite RE100L | 5% | 0.75 | 5.0 | 1.0 | | | | | | |
| | Sylvalite RE85L | | | | | 5.0 | 1.0 | | | | |
| | KE-100 | | | | | | | 5.0 | 0.75 | | |
| | TOTAL | 100.0 | 15.0 | 100.0 | 20.0 | 100.0 | 20.0 | 100.0 | 15.0 | 100.0 | 10.0 |

General Procedure

The designated amount of each material was weighed out into 50 mL beakers and the mixtures were heated to 90° C. with magnetic stirring in a Vario-Mag thermowell stirrer until the contents were completely molten (normally about 20 minutes). After mixing, the molten material was poured into a pan to solidify. The final product was crumbled up into smaller chunksand re-melted to be poured into the ink tank reservoir of the inkjet print fixture.

Characterization of Support Material Compositions and Comparative Examples

Figure 3:
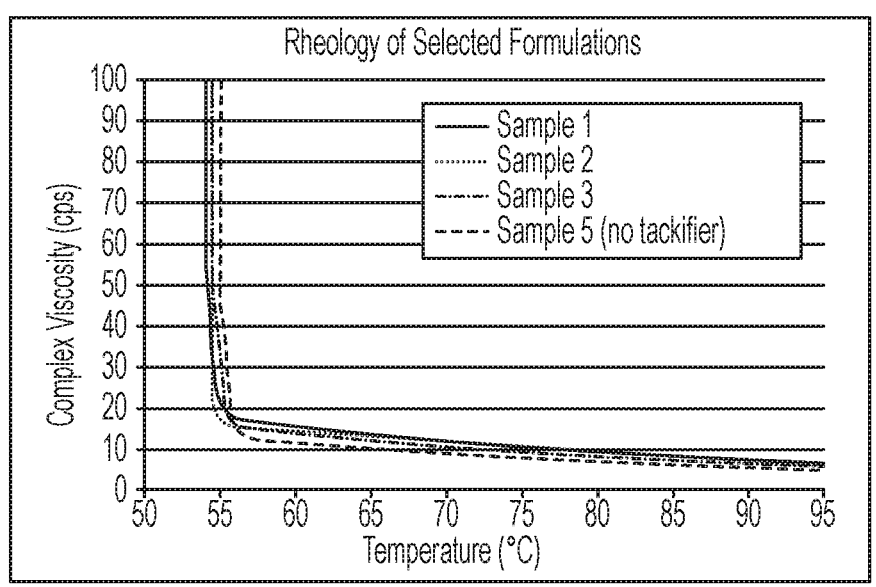
FIG. 3 shows a plot of viscosity versus temperature for support materials prepared with mixtures of fatty alcohols and fatty alcohol ethoxylates, along with a tackifier, and a comparative control material lacking a tackifier.
Figure 4:
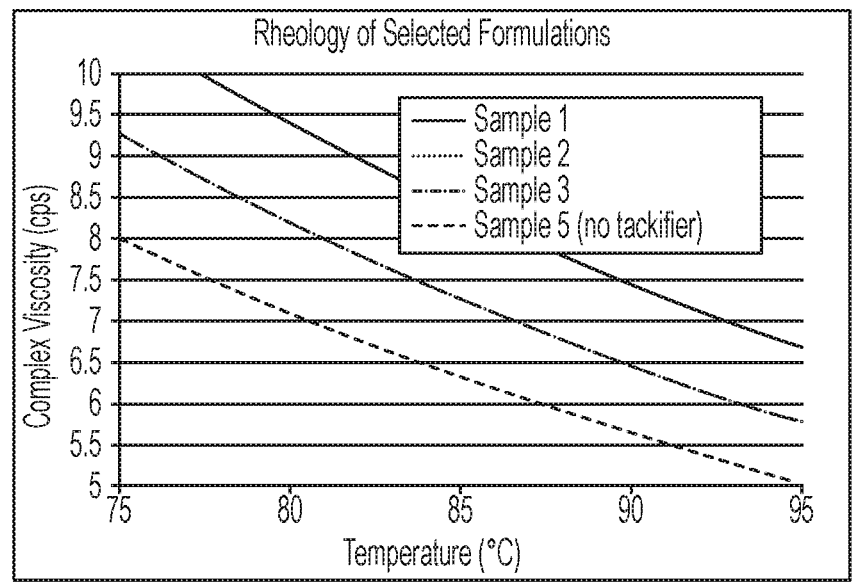
FIG. 4 shows an expanded portion of the plot of FIG. 3.

Rheology: Complex viscosities of the samples were measured over temperature using an Ares G2 rheometer equipped with a 25 mm Parallel plate and Peltier heating system. Samples of the inks were loaded on the rheometer at 102° C., allowed to equilibrate, then swept over temperature at a rate of 1.5° C./min at 10 rad/s until the phase-change took place and the viscosity began to rise rapidly, at which point the test was stopped. FIGS. 3 and 4 show the full range and expansion of the viscosity curves, respectively. The viscosity of the ink samples containing tackifier closely match the control Sample 5 (without tackifier) indicating full miscibility and jettability.

Figure 5:
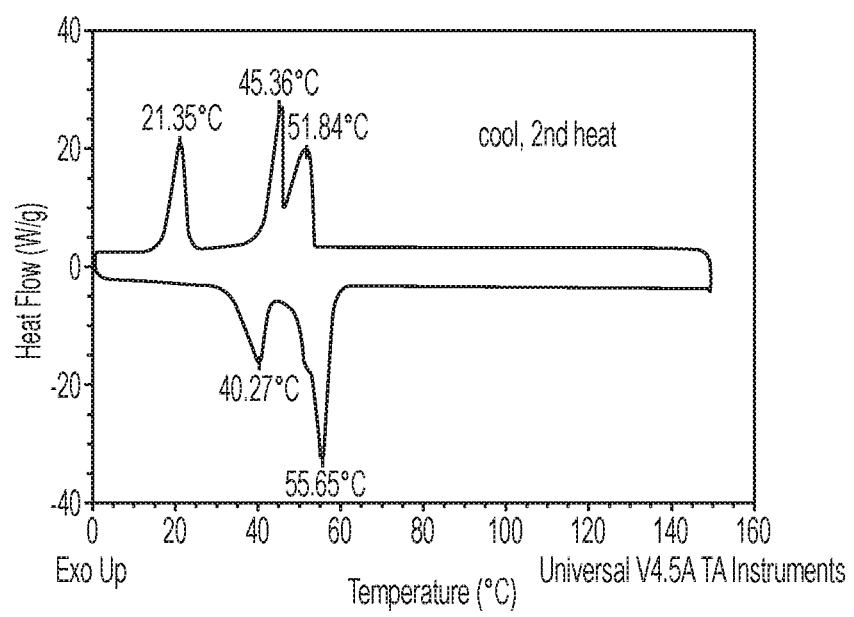
FIG. 5 shows a differential scanning calorimetry (DSC) curve for Sample 1 support material (with tackifier) of Example 2.
Figure 6:
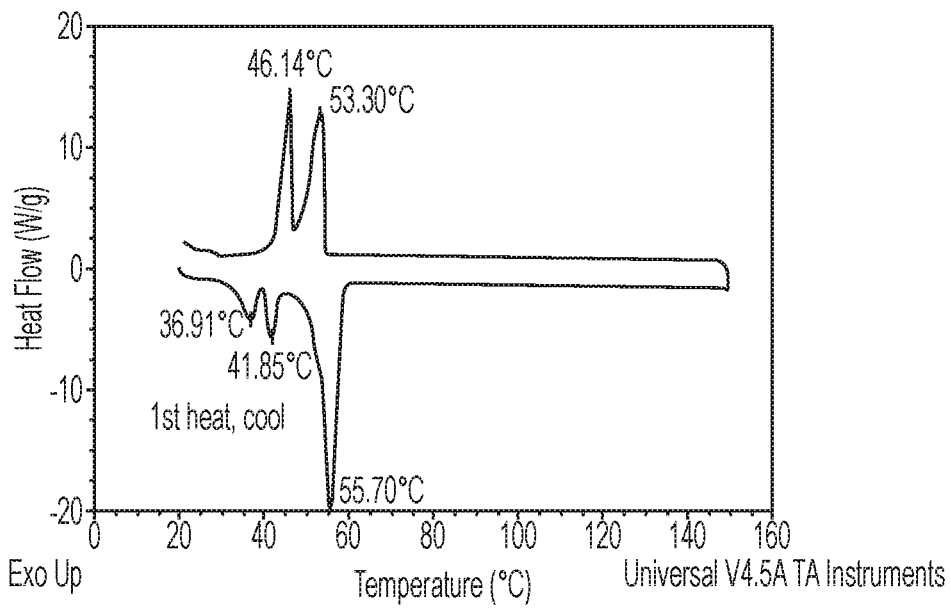
FIG. 6 shows a differential scanning calorimetry (DSC) curve for Sample 5 support material (no tackifier) of Example 2.

DSC Characterization: The DSC was measured at a heating rate of 20° C./min, heat-cool-heat cycle. FIGS. 5 and 6 are the DSC traces of selected samples.

Functional test for dissolvability/meltability: Pucks of material were prepared as per the general procedure and the initial mass was recorded. The puck was then placed in 50 mL beakers containing the appropriate amount of water to result in a 0.1 g/mL solid in solvent dispersion. The beakers were then warmed to 75° C. with stirring at 225 RPM using the Vario-Mag thermowell. The pucks were allowed to melt/dissolve in the warm water bath and the residual puck was removed from the bath, dried, and weighed again. The mass lost was expressed in mg/min. Table 5 summarizes the dissolution data for selected Samples and the Comparative Sample control. Samples 1, 2, and 3 show dissolution rates surpassing the control sample.

Printing results: 100 layer thick build and support structures (ca. 2 mm tall) were inkjet printed on glass substrates, and side photographs were taken to document the improvements of Sample 1 (a composition containing tackifier) versus Sample 5 (control composition without tackifier). Sample 5 clearly showed problematic 'trough' failure modes symptomatic of poor adhesion and surface tension mismatch between build and support materials. Such trough formation was not present in Sample 1.

Figure 7:
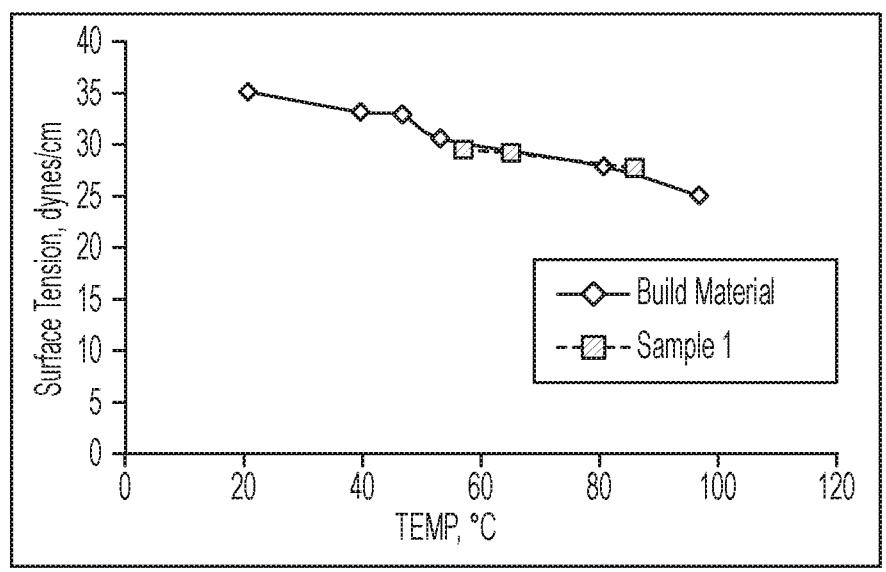
FIG. 7 shows a plot of surface tension versus temperature for Sample 1 support material (with tackifier) of Example 2 and a clear build ink.
Figure 8:
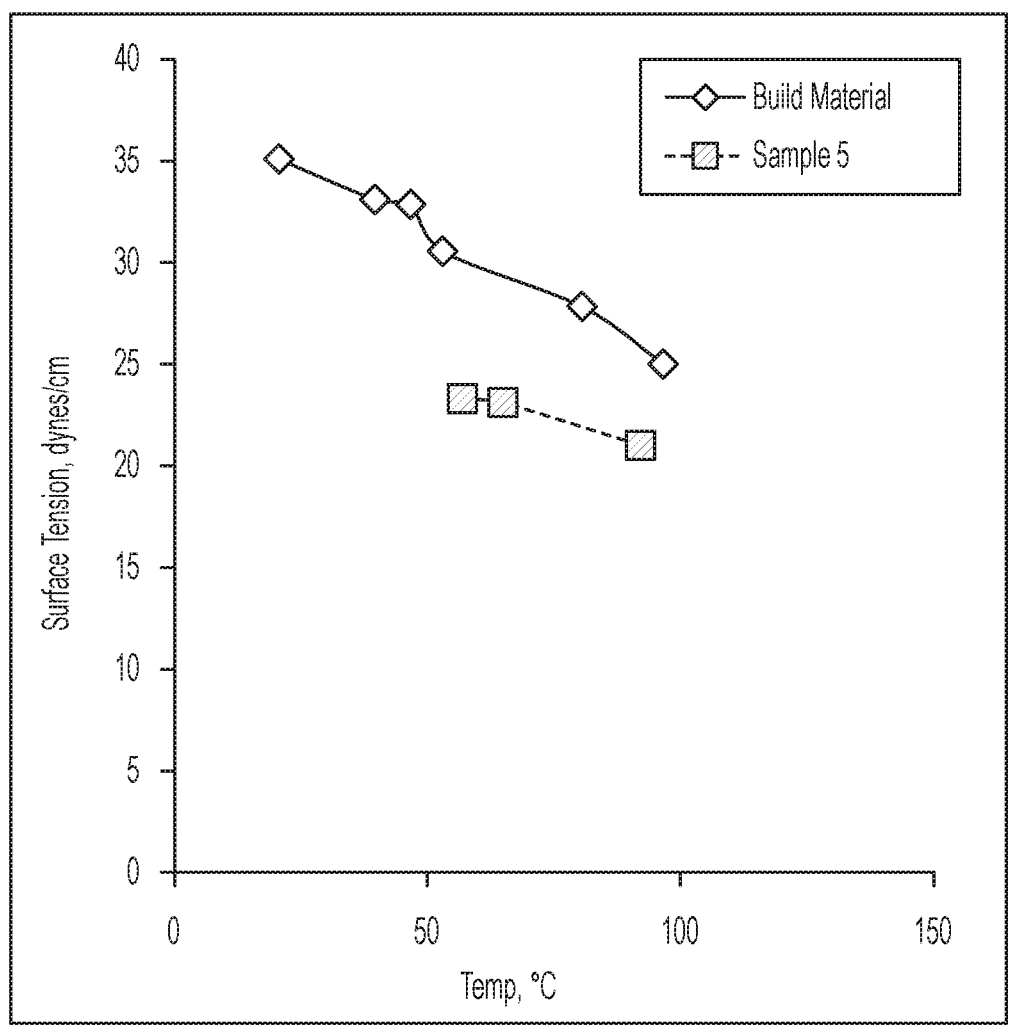
FIG. 8 shows a plot of surface tension versus temperature for Sample 5 support material (no tackifier) of Example 2 and a clear build ink.

Surface tension: FIGS. 7 and 8 are plots of surface tension vs. temperature for 2 build/support materials combinations. FIG. 7 is the overlay of Sample 1 support and a clear build ink, showing significant overlap of the two curves. FIG. 8 shows quite the opposite, where the surface tension values between build and support are not in line with one another, indicating a surface energy mismatch between the two materials. The surface tension of build material and Sample 1 match well with each other whereas the surface tension of Sample 5 is less than the build material indicating that Sample 1 will wet and spread on the build material better that Sample 5 which is a desirable condition for build on support.

Post-processability: Pucks of support materials were tested for solubility temperature and time using a SOP (standard operating procedure). The SOP commences with filling a 1 L beaker with water, and heating to 65° C. with stirring, using a magnetic stir bar. Next, a pre-weighed puck of support materials is dropped into the stirred heated water bath, and stirred for 20 minutes. After 20 minutes, the part residue is removed from the bath, dried, and weighed to monitor the degree of mass lost. The dissolution rate is expressed in mg/min.

Table 6 provides a summary 'scorecard' of Sample 1, control Sample 5 and some comparative commercially available Comparative Samples A and B, where A is a UV curable support, B is a meltable support. Also included is Sample C, which is a meltable/washable support that requires higher melting/washing temperatures.

TABLE 5

| Sample # | 1 | 2 | 3 | 5 (control) |
|---|---|---|---|---|
| Viscosity at 90° C. (cps) | 7.46 | 5.39 | 6.47 | 5.62 |
| Transition Temperature (° C.)[a] | 53.5 | 55.3 | 53.7 | 54.3 |
| Dissolution rate (mg/min)[b] | 458 | 357 | 306 | 240 |

[a]Temperature just before phase change, based on viscosity measurement.
[b]Dissolution rate at concentrated conditions (100 mg/mL) at 75° C.

TABLE 6

| Sample # | A | B | C | 5 | 1 |
|---|---|---|---|---|---|
| Temp (Melts) ° C. | NO | 55 | 80-92 | 55 | 55 |
| Water (Dissolves) | YES | NO | YES | YES | YES |
| Support Removal in H₂O | Fair | Fair | Good | Very Good | Very Good |
| Dissolve Rate @ 20° C. (mg/min) | 280 | 0 | 87 | 0 | 0 |
| Water & Temp | NO | YES | YES | YES | YES |
| Min Effective Temp | <40 C. | 60 C. | 90 C. | 60 C. | 60 C. |

TABLE 6-continued

| Sample # | A | B | C | 5 | 1 |
|---|---|---|---|---|---|
| Dissolve Rate @ MET (mg/min) | 280 | 750 | 385 | 221 | 1507 |
| Dissolve Rate @ 65 C. (mg/min) | N/A | 1275 | 0 | 2160 | 3200 |
| Solvent (Dissolves) | 6% NaOH | EZ Rinse C | IPA | EZ Rinse C | EZ Rinse C |
| Solvent & Temp | NO | YES | YES | YES | YES |
| Support Removal in Solvent | Fair | Very Good | Very Good | Very Good | |

Degree of curl: The inclusion of tackifier gave printed films that were much less prone to curl and delamination from the substrate. Prints were generated on glass substrates at 2400×1600 dpi resolution. It was found that Sample 1 could be built up to 70 layers thick with a room temperature substrate, with no curl or delamination. In contrast, Sample 5 (control with no tackifier), required substrate heating to maintain film adhesion at thick builds up to 70 layers. The summary of the findings is shown below in Table 7.

TABLE 7

| Sample # | Sled (substrate) temperature (° C.) | # of layers | Curl (Yes/No) |
|---|---|---|---|
| 1 | 25 | Up to 70 | No |
| 5 (control) | 25 | <20 | Yes |
| | 28 | 25 | No |
| | 30 | 28 | No |
| | 32 | Up to 70 | No |

Example 2 provides water-washable and meltable support compositions comprising a tackifier additive with improved adhesion, wetting, and dimensional stability. The Sample support ink compositions are jettable at nominal temperatures in line with build ink with matching surface tension of build ink for compatibility The presence of the tackifier improves adhesion to substrates and build interfaces.

What is claimed is:

1. A support material for use in an additive manufacturing comprising:
   greater than about 30 weight percent up to about 70 weight percent of a $C_{12}$ to $C_{18}$ fatty alcohol ethoxylate;
   from about 30 weight percent to about 70 weight percent of a $C_{16}$ to $C_{22}$ fatty alcohol; and
   a tackifier;
   wherein a transition temperature measured as a temperature immediately before phase change, based on a viscosity measurement, is less than about 65° C.;
   further wherein the support material has a dissolution rate at a concentrated condition in water of 100 mg/mL at 75° C. in a range from about 306 to about 458 mg/min;
   wherein the support material has the viscosity measurement of from 5.39 cps to 7.46 cps at 90° C.

2. The support material of claim 1, wherein the support material is removable from a build material by washing, melting, or combinations thereof.

3. The support material of claim 1, further comprising a colorant.

4. The support material of claim 1, wherein a ratio of $C_{12}$ to $C_{18}$ fatty alcohol ethoxylate to $C_{16}$ to $C_{22}$ fatty alcohol is selected for a property matching the support material to a desired build material.

5. A system for additive manufacturing comprising:
   a support material for use in additive manufacturing comprising:
      greater than about 30 weight percent up to about 70 weight percent of a $C_{12}$ to $C_{18}$ fatty alcohol ethoxylate;
      about 30 weight percent to about 70 weight percent of a $C_{16}$ to $C_{22}$ fatty alcohol;
      a tackifier; and
      a build material;
         wherein a transition temperature measured as a temperature immediately before phase change, based on a viscosity measurement, is less than about 65° C.;
   wherein a ratio of $C_{12}$ to $C_{18}$ fatty alcohol ethoxylate to $C_{16}$ to $C_{22}$ fatty alcohol is selected for a property matching the support material to a desired build material;
   wherein the support material has a dissolution rate at a concentrated condition in water of 100 mg/mL at 75° C. in a range from about 306 to about 458 mg/min; and
   further wherein the support material has the viscosity measurement of from 5.39 cps to 7.46 cps at 90° C.

6. The system of claim 5, wherein the support material is removable from the build material by washing, melting, or combinations thereof.

7. The system of claim 5, wherein the support material comprises a colorant.

8. The system of claim 5, wherein the build material comprises a colorant.

9. The system of claim 5, wherein the build material comprises acrylate functional monomers.

* * * * *